(12) United States Patent
Iwahashi et al.

(10) Patent No.: US 8,868,410 B2
(45) Date of Patent: Oct. 21, 2014

(54) NON-DIALOGUE-BASED AND DIALOGUE-BASED LEARNING APPARATUS BY SUBSTITUTING FOR UTTERED WORDS UNDEFINED IN A DICTIONARY WITH WORD-GRAPHS COMPRISING OF WORDS DEFINED IN THE DICTIONARY

(75) Inventors: Naoto Iwahashi, Tokyo (JP); Noriyuki Kimura, Tokyo (JP); Mikio Nakano, Saitama (JP); Kotaro Funakoshi, Saitama (JP)

(73) Assignees: National Institute of Information and Communications Technology, Tokyo (JP); Honda Motor Co., Ltd., Tokyo (JP)

( * ) Notice: Subject to any disclaimer, the term of this patent is extended or adjusted under 35 U.S.C. 154(b) by 835 days.

(21) Appl. No.: 12/675,381
(22) PCT Filed: Aug. 29, 2008
(86) PCT No.: PCT/JP2008/065498
§ 371 (c)(1),
(2), (4) Date: Feb. 25, 2010
(87) PCT Pub. No.: WO2009/028647
PCT Pub. Date: Mar. 5, 2009

(65) Prior Publication Data
US 2010/0250241 A1 Sep. 30, 2010

Related U.S. Application Data

(60) Provisional application No. 60/969,602, filed on Aug. 31, 2007.

(51) Int. Cl.
*G06F 17/21* (2006.01)
*G10L 15/00* (2013.01)
*G10L 15/18* (2013.01)
*G10L 15/22* (2006.01)
*G06F 17/27* (2006.01)
*G10L 15/06* (2013.01)

(52) U.S. Cl.
CPC ......... *G10L 15/1822* (2013.01); *G06F 17/2735* (2013.01); *G10L 15/22* (2013.01); *G10L 15/063* (2013.01)

USPC .............................. 704/10; 704/243; 704/257

(58) Field of Classification Search
CPC .... G06F 17/2735; G10L 15/063; G10L 15/22
See application file for complete search history.

(56) References Cited

U.S. PATENT DOCUMENTS 5,131,043 A * 7/1992 Fujii et al. ..................... 704/254
5,390,278 A * 2/1995 Gupta et al. ................... 704/243
(Continued)

FOREIGN PATENT DOCUMENTS

JP H3-123257 A 5/1991
JP 2000-259645 A 9/2000
(Continued)

OTHER PUBLICATIONS

Translation of PCT/ISA/237, IB338, and IB373 of PCT/JP2008/065498.
(Continued)

*Primary Examiner* — Farzad Kazeminezhad
(74) *Attorney, Agent, or Firm* — Chen Yoshimura LLP

(57) ABSTRACT

The invention provides a dialogue-based learning apparatus through dialogue with users comprising: a speech input unit (10) for inputting speeches; a speech recognition unit (20) for recognizing the input speech; and a behavior and dialogue controller (30) for controlling behaviors and dialogues according to speech recognition results, wherein the behavior and dialogue controller (30) has a topic recognition expert (34) to memorise contents of utterances and to retrieve the topic that best matches the speech recognition results, and a mode switching expert (35) to control mode switching in accordance with a user utterance, wherein the mode switching expert switches modes in accordance with a user utterance, wherein the topic recognition expert registers a plurality words in the utterance as topics in first mode, performs searches from among the registered topics, and selects the maximum likelihood topic in second mode. Finally for every uttered word which is not found in a predetermined dictionary, it substitutes the said word with a word-graph comprising of either a known or a combination of known words in the said dictionary.

9 Claims, 6 Drawing Sheets

(56) References Cited

U.S. PATENT DOCUMENTS

| | | | |
|---|---|---|---|
| 5,454,062 A * | 9/1995 | La Rue | 704/254 |
| 6,836,822 B1 * | 12/2004 | Hatano et al. | 711/117 |
| 6,839,670 B1 * | 1/2005 | Stammler et al. | 704/251 |
| 7,054,812 B2 * | 5/2006 | Charlesworth et al. | 704/251 |
| 7,228,276 B2 * | 6/2007 | Omote et al. | 704/243 |
| 7,349,851 B2 * | 3/2008 | Zuberec et al. | 704/270 |
| 2002/0131563 A1 | 9/2002 | Sobue | |
| 2005/0143998 A1 * | 6/2005 | Ogawa | 704/251 |
| 2005/0182558 A1 * | 8/2005 | Maruta | 701/200 |
| 2006/0069564 A1 * | 3/2006 | Allison et al. | 704/257 |
| 2008/0094256 A1 * | 4/2008 | Koen | 340/988 |

FOREIGN PATENT DOCUMENTS

| | | |
|---|---|---|
| JP | 2002-281145 A | 9/2002 |
| JP | 2004-333737 A | 11/2004 |
| JP | 2004-334591 A | 11/2004 |
| JP | 2005-257917 A | 9/2005 |
| JP | 2006-243673 A | 9/2006 |
| JP | 2007-13931 A | 1/2007 |
| WO | 03/088209 A1 | 10/2003 |

OTHER PUBLICATIONS

International Search Report (ISR) for PCT/JP2008/065498 for Examiner consideration.

Asami et al., "Detection of Topic and Speech Act Type on Utterance-by-Utterance Basis for Coversational Interfaces (Onsei Interface no Tameno Hatsuwa o Tan'i to shita Wadai Oyobi Hatsuwa Koi Type no Suitei)", The Transactions of the Institute of Electronics, Information and Communication Engineers, Feb. 1, 2004. vol. J87-D-II, No. 2, pp. 436-446.

Iwayama et al., "A Probabilistic Model for Text Categorization: Based on a Single Random Variable with Multiple Values", The Proceedings of the fourth conferences on Applied natural language processing, Oct. 13, 1994, pp. 162-167.

* cited by examiner

-------- the sentence candidate with maximum likelihood

A Word Graph for Utterence kore ga umi dayo
("This is the sea" in English)

Topic Recognition Rate vs. Number of Sentence Candidates

Topic Recognition Rate vs. Ratio of Index Terms to Input Words

Fig. 7

U0: Switch to the Learning Mode.

R1: I will learn names of places.
(The robot moves near the user.)

U2: Here is our kitchen.

R3: I have learned the name of this place.
(The user moves and the robot follows the user.)

U4: Here is the front door.

R5: I have learned the name of this place.

U6: Switch to the execution mode.

R7: I have switched to the execution mode.

U8: Go to the kitchen.

R9: I go.
(The robot moves to the kitchen.)

NON-DIALOGUE-BASED AND DIALOGUE-BASED LEARNING APPARATUS BY SUBSTITUTING FOR UTTERED WORDS UNDEFINED IN A DICTIONARY WITH WORD-GRAPHS COMPRISING OF WORDS DEFINED IN THE DICTIONARY

TECHNICAL FIELD

The present invention relates to an apparatus that enables a domestic robot to learn words through speech interaction and, more particularly, to an apparatus that enables a robot to learn undefined words in a robot's dictionary for automatic speech recognizer, e.g., names for location, rooms, and people.

BACKGROUND ART

Robots which help domestic affairs such as cleaning are expected. Such robots must know names of locations in owners' homes or offices in order to accept spoken directions from owners. However, as robots cannot have a complete list of those location names in advance, owners must provide such information to robots somehow while in use.

One of the least burdensome instruction methodologies is on-site oral instruction, that is, to go to a target place with a robot and tell the robot the name of that place using speech.

SUMMARY OF THE INVENTION

Current automatic speech recognizers identify only pre-defined words. Specifically, a Large Vocabulary Automatic Speech Recognizer (LVASR) recognizes input speech as sentences by interlinking predefined words in its dictionary (hereinafter, "known words"), hence it cannot recognize words not in dictionary (hereinafter, "unknown words"). Although a dictionary usually contains thousands or tens of thousands of words, it is impossible to register all words used in dairy life in advance. Because users generally do not know if a word is in a dictionary or not, it is also impossible to expect users to speak only with known words. Nevertheless, such unknown words frequently appear especially as proper names (e.g., product names and company names). This is the so-called "out-of-vocabulary word problem".

Moreover, the recognition performance of current speech recognizers in terms of accuracy is still far behind that of humans, especially in noisy environments even in dairy life. Even if users speak only with known words, recognition errors happen often due to many reasons including background noises.

We cannot build robots that robustly learn location names as long as very accurate speech recognition results are presupposed. Therefore, a robust understanding method, which copes with these problems—out-of-vocabulary and misrecognition—is necessary for human-robot spoken interaction.

Another method that a robot itself learns new words may be possible, however, a great deal of preliminary arrangement is necessary to provide an automatic speech recognizer with learning functions. It leads to a rather complex system to realize a learning mode.

In view of the above problems, an object of the present invention is to provide a non-dialogue-based learning apparatus and dialogue-based learning apparatus that enable to recognize undefined words in its dictionary even if those unknown words are contained in user utterances.

The invention provides a non-dialogue-based learning apparatus or an dialogue-based learning apparatus through dialogue with users comprising: a speech input unit for inputting speeches; a speech recognition unit for recognizing the input speech; and a behavior and dialogue controller for controlling behaviors and dialogues according to speech recognition results, wherein the behavior and dialogue controller has a topic recognition expert to memorise contents of utterances and to retrieve the topic that best matches the speech recognition results, and a mode switching expert to control mode switching in accordance with a user utterance, wherein the mode switching expert switches modes, wherein the topic recognition expert registers a plurality of spoken topics in first mode, performs searches from among the registered topics, and selects the maximum likelihood topic in second mode.

In the present invention, the topic recognition expert generates word graphs in the first mode. The word graphs, considered as topics, preferably represent phonetic-similar words and combinations of those words for unknown phonemes when a user utterance includes undefined words in the dictionary of the speech recognition unit.

BRIEF DESCRIPTION OF THE DRAWINGS

FIG. 7 is a diagram showing a script to describe an operation of a mode switching expert and a topic recognition expert in the behavior and dialogue controller of FIG. 6;

Figure 1:
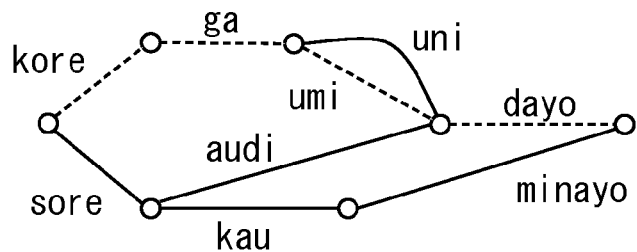
FIG. 1 is a diagram showing a word graph in accordance with the present invention.

| Reference Signs List | |
|---|---|
| 1 | Dialogue-based learning apparatus |
| 10 | Speech input unit |
| 20 | Speech recognition unit |
| 21 | Small vocabulary automatic speech recognizer |
| 22 | Large vocabulary automatic speech recognizer |
| 30 | Behavior and dialogue controller |
| 31 | Understanding module |
| 32 | Task planning module |
| 33 | Action selecting module |
| 34 | Topic recognition expert |
| 35 | Mode switching expert |
| 40 | Dialogue unit |
| 50 | Behavior unit |

BEST MODE FOR CARRYING OUT THE CLAIMED INVENTION

Hereinafter, a specific architecture of the dialogue-based learning apparatus in accordance with an embodiment of the present invention, (hereinafter, which may be referred to as a "robot"), will be described. First, the outline of the dialogue-based learning apparatus of the present invention, and then its architecture will be described.

[1] Outline of the Dialogue-based Learning Apparatus

(1-1) Basic Operation

This embodiment of the present invention describes how the dialogue-based learning apparatus recognizes unknown words (unregistered in the dictionary), specifically names for locations or rooms (hereinafter, "name information") in an user utterance. More specifically, the embodiment relates to a learning task for location names. In the location-name-learning task, a robot moves around by following its user and learns spoken location names as pairs of name information and coordinate information. In other words, if the user speaks an utterance U at a position P, the robot extracts name information from U, associates it with P, and commits the associated pair to memory.

A standard way of name information extraction is to perform automatic speech recognition on the utterance U and extract nouns from the recognized word sequence. However, instead of noun sequence, the embodiment uses frequency patterns of words not limited to nouns as name information. This extraction method is described later.

After learning ends, the robot moves to the location the user indicates using speech in execution mode. The robot extracts name information from a user utterance, retrieves coordinate information from memory, and moves to the intended location. This identification method is also described later.

(1-2) Speech Recognition of the Dialogue-Based Learning Apparatus

The dialogue-based learning apparatus enables dialogue with users, or speakers, especially, it enables to memorise unknown words, or undefined words in the preinstalled dictionary for automatic speech recognizer when a user utterance includes such unknown words. Once the dialogue-based learning apparatus memorises unknown words, it recognizes those words in the user utterance thereafter. For example, proper names (e.g., location or person name) are generally undefined in the dictionary for automatic speech recognizer. However, the embodiment is characterized by learning such proper names. For example, when a user speaks "Sato" as someone's name, the apparatus learns its phonetics as "Sato", and thereafter, recognizes that phonetics as "Sato" in the user utterance.

(1-3) Assumptions for Speech Recognition

In order to cope with such unknown words, the dialogue-based learning apparatus in accordance with this embodiment is based on the following assumptions (A) to (F) for human-robot interaction.

(A) the interaction between a robot and a user consists of two clearly separated modes, that is, a learning mode to learn unknown words and an execution mode to recognize the learned unknown words and execute predetermined actions. The dialogue-based learning apparatus is characterized by the operation in these two modes.

(B) the user explicitly declares the mode of the next interaction before starting learning or execution, (C) once a mode is declared, the robot and user keep engaging in that mode until another speech command switches the mode, (D) each utterance from the user contains only the name information of just one location or only one command to switch to the next mode, (E) in the learning mode, the provided name information specifies the current position of the robot, and (F) in the execution mode, the provided name information specifies the position where the robot should go.

Under these restrictions, the dialogue-based learning apparatus performs a predetermined operations.

(1-4) Speech Recognition Method of the Embodiment

The dialogue-based learning apparatus in accordance with this embodiment is characterized by using a speech topic recognition method (Bag of Words in a Graph: BWG), which enables robots to recognize topics of utterances spoken without any restrictions of words and grammar.

Name information is acquired as a frequency pattern of salient words in recognition results. This embodiment refers to such a frequency pattern as a topic.

Specifically, the speech topic recognition method enables a robot to understand utterances, or topic, without setting a limit on vocabulary or grammar. As described above, the method consists of two modes, the learning mode and the execution mode correspond to a learning phase and a recognition phase respectively. In the learning phase, a spoken location name or person's name is acquired as a topic associated one or combination of user utterance. In the recognition phase, in turn, an appropriate topic is selected for input utterance from among the topics acquired in the learning phase.

The speech topic recognition method has the following two features:

(a) to recognize an utterance containing not only one-best sentence candidate but multiple candidates, and (b) to consider a word graph as a sentence and to recognize a topic in an utterance using a topic recognition technique.

Therefore, even if an utterance contains just one word, a topic of the utterance will be represented with a set of words.

(1-4-1) Speech Recognition Using Word Graphs

A word graph consists of a set of edges representing recognized words and a set of vertexes representing time points. FIG. 1 illustrates a word graph. Sentence candidates of the first to N-th ranks can be selected from a word graph according to acoustic and linguistic likelihood.

This embodiment is characterized by a speech recognition method that unknown words are substituted by one or a combination of known word having similar phonemes when a speech containing an unknown word is input. Moreover, in this embodiment, using not one best sentence candidate but a word graph itself as speech recognition results reduces loss of information and enhances the robustness of post-processing against input of unknown words and misrecognition.

(1-4-2) Application of Word Graphs in a Document Topic Recognition Method

The speech topic recognition method in accordance with the embodiment considers a word graph as a document and applies a statistical document topic recognition method. A Single Random Variable with Multiple Values method is adopted for the topic recognition. The method is disclosed by M. Iwayama and T. Tokunaga in "A probabilistic model for text categorization: Based on a single random variable with multiple values," in *In Proc. Of the 4rth Applied Natural Language Processing Conference (ANLP)*, 1994, pp. 162-167.

This method is based on the bag-of-words model, in which the topic of a document is defined as a word frequency pattern that is independent of orders and positions of words in the document.

the probability P(c|d) that a document d is a topic c is represented as shown below. Here, $T=t_i$ represents a probability variable event that an index term randomly selected from document d is $t_i$.

$$P(c \mid d) = \sum_{t_i} P(c \mid d,)P(T = t_i \mid d) \quad (1)$$
$$\approx \sum_{t_i} P(c \mid T = t_i)P(T = t_i \mid d)$$

At the learning phase, $P(c|T=t_i)$ is obtained from a set of speech samples for learning. On counting words in a word graph, the number of types, not the number of tokens, is used. That is, in a word graph, a word is counted as one even if it appears more than once. When the number of tokens is used in a preliminary test, it degraded results. The embodiment does not use acoustic likelihood scores, either.

At the recognition phase, $P(T=t_i|d)$ is obtained from an input utterance and P(c|d) is calculated to decide the topic of document d as below, where C is a set of topics acquired at the learning phase.

$$\text{topic}(d) = \underset{c_j \in C}{\text{argmax}} P(c_j \mid d) \quad (2)$$

The topic c that maximizes P(c|d) is selected as the recognition result as shown in the formula 2.

Possible index terms are determined by their mutual information with topics from among words in learning data. That is, the number of index terms according to mutual information and a threshold is limited. Mutual information $I(T_i;c)$ is given as below.

$$I(T_i;c) \leq H(c) - H(c|T_i) \quad (3)$$

Here, $T_i$ takes a binary value that indicates whether index term $t_i$ exists in a given document or not. H(c) is the entropy of a probability variable c. If c and $T_i$ are independent of each other, $I(T_i;c)$ is 0. By using mutual information less informative terms can be excluded.

If a user utterance includes an unknown word, the dialogue-based learning apparatus in accordance with the embodiment generates a word graph based on the utterance corresponds to the unknown words and memorises it. Thereafter, if the same unknown word is included in the user utterance, the apparatus determines a corresponding word graph with user utterance from among the memorised candidates. Specifically, the apparatus performs search a correspondences with the unknown word among a plurality of memorised topics according to the formula 1 and 2 described above. Furthermore, based on the mutual information 3, the most probabilistic one associated with the topic is determined from among the candidates, for example, from among a plurality of words.

A word input to a robot, that is, an undefined word in its dictionary, is extracted and recognized as the best-matched topic (frequency pattern) with the speech recognition result.

By using frequency patterns, the apparatus is robust against misrecognitions. In addition it is free from the out-of-vocabulary problem.

(1-4-3) Evaluation

To generate word graphs from speech, an HMM-based LVCSR software, developed at Advanced Telecommunication Research Institute (ATR) with a microphone embedded in a portable PC, was used. The language model and lexicon were built from a conversational corpus of 1M utterances in a travel domain. The size of lexicon was 100K words. To simulate situations where unknown words dominate topics and to evaluate BWG in such situations, 10 unregistered person names were used as topics. That is, only these names are out of the vocabulary. Both for acquisition and recognition, a 30's male subject uttered five predefined sentences for each topic. These sentences are shown below. X in each sentence is replaced with on of 10 names. Note that there are no overlaps between the sentences used in the learning phase and the sentences used in the recognition phase. As these sentences show, BWG enables robots to recognize topics from utterances that include not learned words or phrases (e.g., "Where is" and "Please call" in the sentences below).

[The Learning Phase]
(Example 1) He is Mr. X.
(Example 2) Mr. X is famous.
(Example 3) This belongs to Mr. X.
(Example 4) Mr. X is the manager.
(Example 5) Do you know Mr. X?

[The Recognition Phase]
(Example 6) Where is Mr. X's desk?
(Example 7) Please call Mr. X.
(Example 8) I'm looking for Mr. X.
(Example 9) This is what Mr. X makes do with.
(Example 10) Mr. X is responsible for this.

Figure 2:
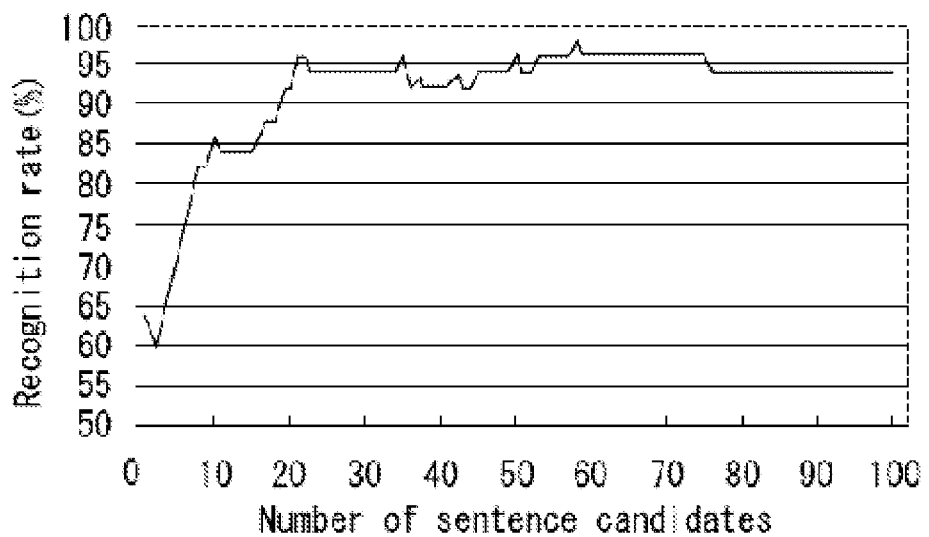
FIG. 2 is a correlation chart between a topic recognition rate and the number of documents in accordance with an embodiment of the present invention.

First the effect of word graph size over topic recognition rate was investigated. The size of a word graph is determined according to how many sentence candidates are included in the graph. As shown in FIG. 2, the larger the word graph size is, the higher the topic recognition rate is (the maximum is at N=58). Thus it is concluded that the reduction in information loss using word graphs is successful to improve the topic recognition rate.

Figure 3:
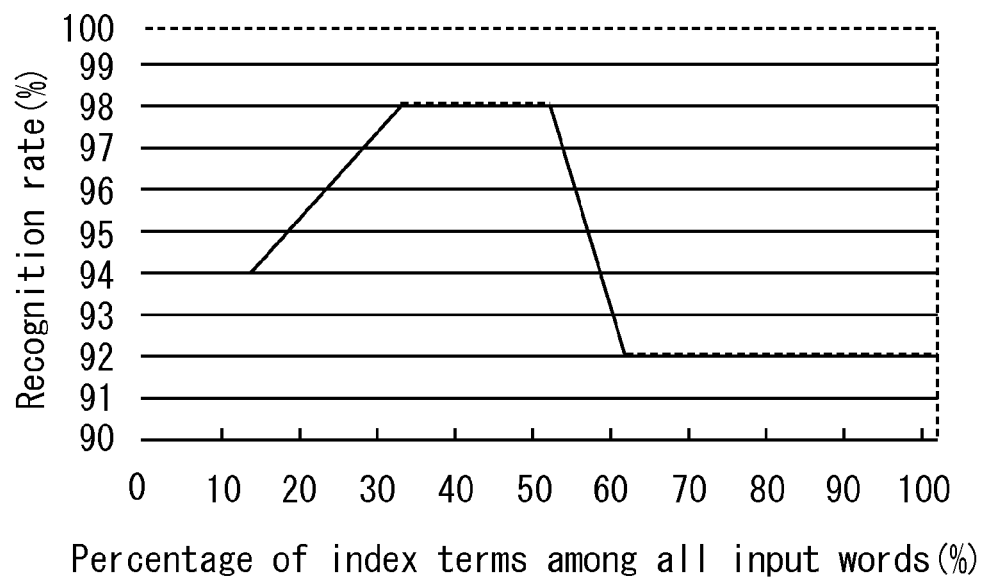
FIG. 3 is a correlation chart between a topic recognition rate and percentage of index term in accordance with an embodiment of the present invention.

Next the effect of limiting the number of index terms according to mutual information was investigated. Topic recognition rate over the ratio of index terms to all input words is shown in FIG. 3, where the word graph size is fixed at N=58 (the number of sentence candidates in a graph). The highest recognition rate was gained between 30% and 50%. Both too few and too many index terms deteriorated the recognition rate. This is understandable from the relation between the amount of learning data and the complexity of a model. It is concluded that mutual information is effective to select index terms.

[2] Architecture of the Dialogue-based Learning Apparatus

Figure 4:
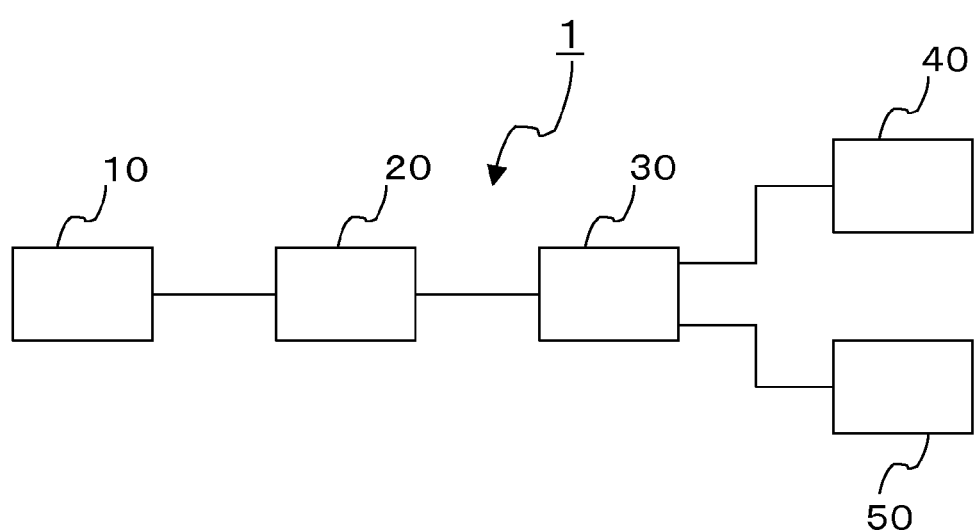
FIG. 4 is a block diagram showing a dialogue-based learning apparatus in accordance with an embodiment of the present invention.

FIG. 4 is a block diagram showing the dialogue-based learning apparatus 1 in accordance with an embodiment of the present invention.

The dialogue-based learning apparatus 1 of the embodiment in accordance with present invention comprises a speech input unit 10 which outputs a user utterance as a speech signal (for example, a microphone), a speech recognition unit 20 that performs A/D conversion of speech signals from the speech input unit 10 and that extracts features like sound pressure from the A/D converted speech signals to recognize speeches, a dialogue and behavior controller 30 which controls dialogues and behaviors according to the speech recognition results, and a dialogue unit 40 and a behavior unit 50 which operate under the control of the dialogue and behavior controller 30.

The speech recognition unit 20 extracts features from time-series speech signals supplied from the speech input unit 10, and recognizes speeches based on the words and grammar stored in a dictionary unit (not shown) and a grammatical unit (not shown) respectively.

Based on the speech recognition results, the dialogue and behavior controller 30 performs the resultant command (command in a user utterance) to enter the learning mode or the execution mode. In other words, the dialogue and behavior controller 30 determines the mode that a user uttered (for example, learning mode) based on the user utterance recognized in the speech recognition unit 20. The same applies to the execution mode.

The dialogue and behavior controller 30 is characterized by the following architecture which enables to switch the two modes.

Figure 5:
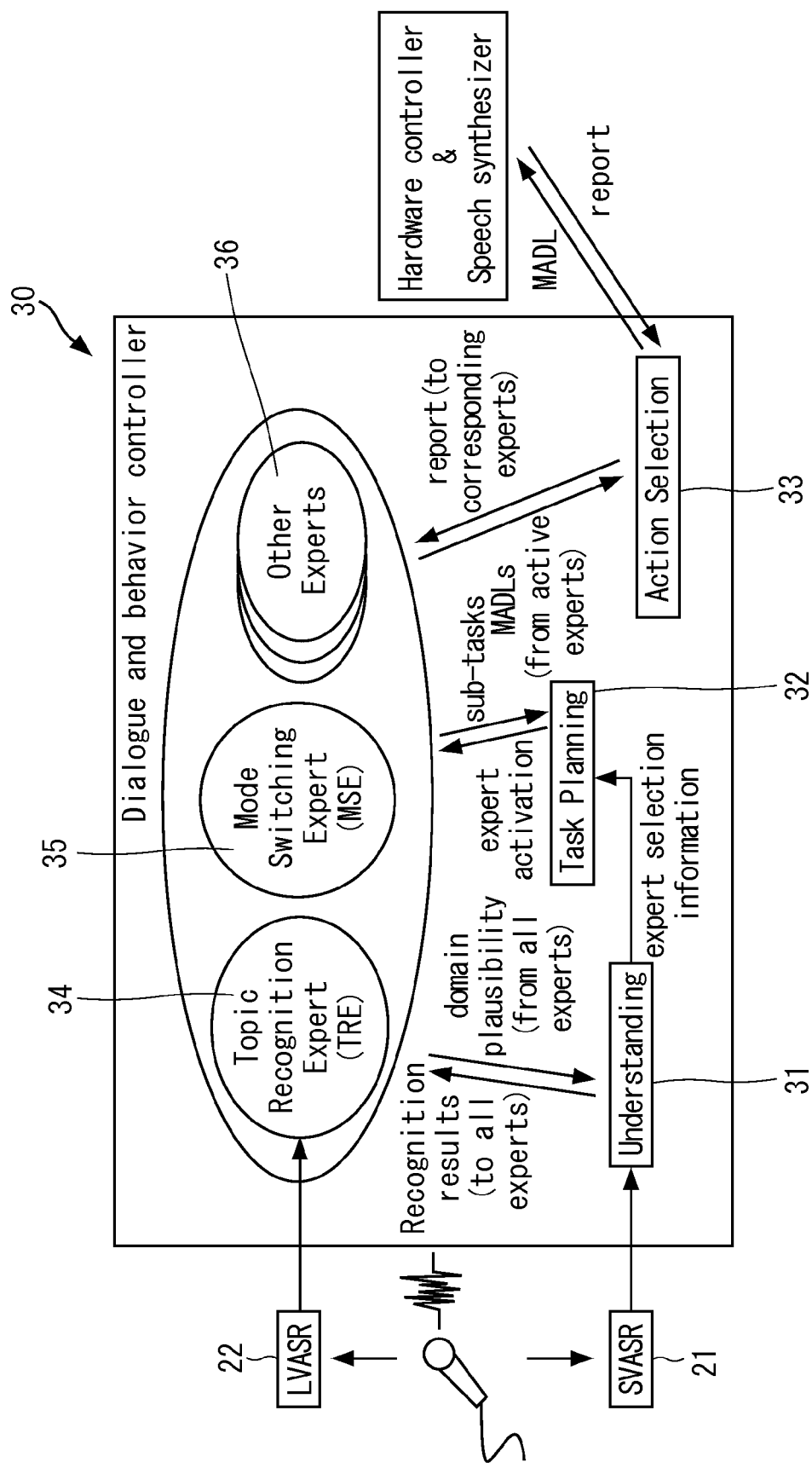
FIG. 5 is a block diagram showing dialogue and behavior controller of the dialogue-based learning apparatus of FIG. 4.

FIG. 5 is a block diagram showing a dialogue and behavior controller of an embodiment in accordance with the present invention. The dialogue and behavior controller 30 is built on RIME (Robot Intelligence based on Multiple Experts), which employs multiple modules referred to as experts, each of which is responsible for certain kinds of tasks such as a dialogue in a specific domain and a task using physical behaviors like moving to somewhere. The output of the dialogue and behavior controller 30 is in the form of what we call MADL (Multi-modal Action Description Language), which includes one or a combination of speech synthesis commands with text (e.g., "hello") and symbolic representations of physical action commands (e.g., "gesture hello" and "approach John". The commands in one MADL are performed simultaneously.

As shown in FIG. 5, the dialogue and behavior controller 30 comprises an understanding module 31, a task planning module 32, an action selection module 33, topic recognition expert 34, mode switching expert 35, and other experts 36.

The speech recognition unit 20 comprises an SVASR (Small Vocabulary Automatic Speech Recognizer) 21 and an LVASR (Large Vocabulary Automatic Speech Recognizer) 22, which are shown in FIG. 5. The topic recognition expert uses its own LVASR 22 while understanding module 31 and the experts 34 to 36 share the SVASR 21.

The understanding module 31 dispatches the recognition results to each expert 34 to 36 and suggests the most appropriate expert to the task planning module 32 according to a score (plausible degree) returned from the experts 34 to 36. Specifically, each expert 34 to 36 interprets the recognition results of an utterance pattern in user speech. For example, when a user utters "switch to a learning mode", each expert performs speech recognition for the "learning" words in the utterance. Then, they return a score between 0 and 1 to the understanding module 31 and the score indicates the plausibility that the human utterance should be dealt with by the expert. From among the experts 34 to 36, the understanding module 31 selects one with the highest score as target expert and output it to the task planning module 32.

The task planning module 32 decides which expert should take charge based on the output from the task planning module 32.

The action selection module 33 asks the selected expert to decide actions to perform and outputs a control information to the behavior unit 50 which controls a hardware and to the Dialogue unit 40 which synthesizes and outputs speeches.

As described above, the action selection module 33 comprises experts 34 to 36, or a mode switching expert 35, a topic recognition expert 34, and other expert 36.

Each expert is specialized for performing certain kinds of subtasks. When the robot is trying to perform a subtask, the expert corresponding to the subtask and activated in the dialogue and behavior controller 30 is used for the robot to select following actions. When a human utterance is received, the expert to become in charge is determined by its understanding results on the understanding unit 31 and the context in the user utterance. The experts 34 to 36 are a kind of object in the object-oriented programming framework. Each expert has its own internal state, which includes understanding result, grounding status indicating the rate for the recognition through speech interaction between the robot and its user, local action plans for specialized tasks of each expert, and other information.

Subtasks of each expert 34 to 36 are now illustrated.

The main subtask of the mode switching expert 35 is to determine that the command to activate either of the two modes described above, that is, the learning mode or the execution mode, is included in the results on the speech recognition unit. For example, when the words referred to the learning mode are included in the speech recognition results, the mode switching expert 35 terminates the execution mode and outputs the signal to each expert for whole the apparatus to switch to the learning mode. According to the signals, other experts switch their internal state to another mode.

The topic recognition expert 34 generates a word graph corresponding to a phonemic file based on a user utterance. Every phrase in the user utterance is provided with a word graph shown in FIG. 1.

For example, the topic recognition expert 34 generates a networked word graph shown in FIG. 1 based on the speech recognition using the LVASR 22, the dictionary stored in the memory unit (not shown), and language models and the like, specifically, compared result with input speeches, acoustic models, language models, and the dictionary. This embodiment generates a word graph following the method disclosed in the Japanese Published Patent Application No. 6-295198 A.

The generated word graphs are stored in the memory unit (not shown) of the module in the topic recognition expert 34.

Such word graphs are generated in the execution mode corresponding to the user utterances excluding commands as well as in the learning mode. To be specific, a word graph is generated in the learning mode for a robot to memorise unknown words.

The topic recognition expert 34 performs speech recognition for unknown words (undefined words in its dictionary) based on the generated word graphs. Specifically, the apparatus in the learning mode generates a word graph for one or combination of user utterance which includes unknown words, then memorises a frequency pattern for each word in the generated word graph. As described in (E), name information provided in the learning mode specifies the current position of a robot. Therefore, the topic recognition expert 34 memorises the information for current position, the absolute coordinate system for example, as well as frequency pattern.

Thereafter, when a user moves to other location and utters "Here is D" (D represents a location), a new word graph is generated according to the input speech. At the same time, the location information is also memorized. In the above example, D represents a location name.

When a user utterance includes a plurality of unknown words, word graph is generated for each unknown word. These word graphs correspond to topics for user utterances. Each word graph generated in the learning mode corresponds to "topic c" in the formula (I) described above.

When a user utters unknown words, the dialogue-based learning apparatus 1 in the learning mode computes probability of applying for those input unknown words to be applied to one of the topics c, and extracts most probabilistic topic. The formula (1) and (2) are used for computing.

For example, when a user utters "Go to A", the dialogue-based learning apparatus 1 in the execution mode generates a word graph shown in FIG. 1 (hereafter, "reference text d") according to the input utterance "Go to A".

Then, it extracts topic c which maximizes the probability P (c|d) that the reference text d is the topic c, using the random variable "T=$t_i$", which means an event that an index term t is randomly extracted from the reference text d (see the formula (1) and (2)). In this case, the word graph generated according to the input utterance "Here is A" is extracted as a topic c. The location information "A" (absolute coordinate, for example) is registered in the robot, and the topic recognition expert is designed to output location information for "A" to a module, for example, a task planning module.

The dialogue unit 40 and the behavior unit 50 are controlled to perform desired operations by the behavior and dialogue controller 30 with above designs. Under the control of the behavior and dialogue controller 30, the dialogue unit 40 is adapted to synthesize speeches to generate a dialogue for interaction with users, and to output them through a speaker (not shown). The behavior unit 50 with a traveling device such as wheels and a driving motor which moves to the predetermined location under the control of the behavior and dialogue controller 30.

[3] Action of the Dialogue-based Learning Apparatus

First, the outline for the operation of the dialogue-based learning apparatus 1 will be described with reference to FIG. 6. Then operations of the mode switching expert 35 and the topic recognition expert 34 are described following the script (interaction between a user and a robot) shown in FIG. 7

Figure 6:
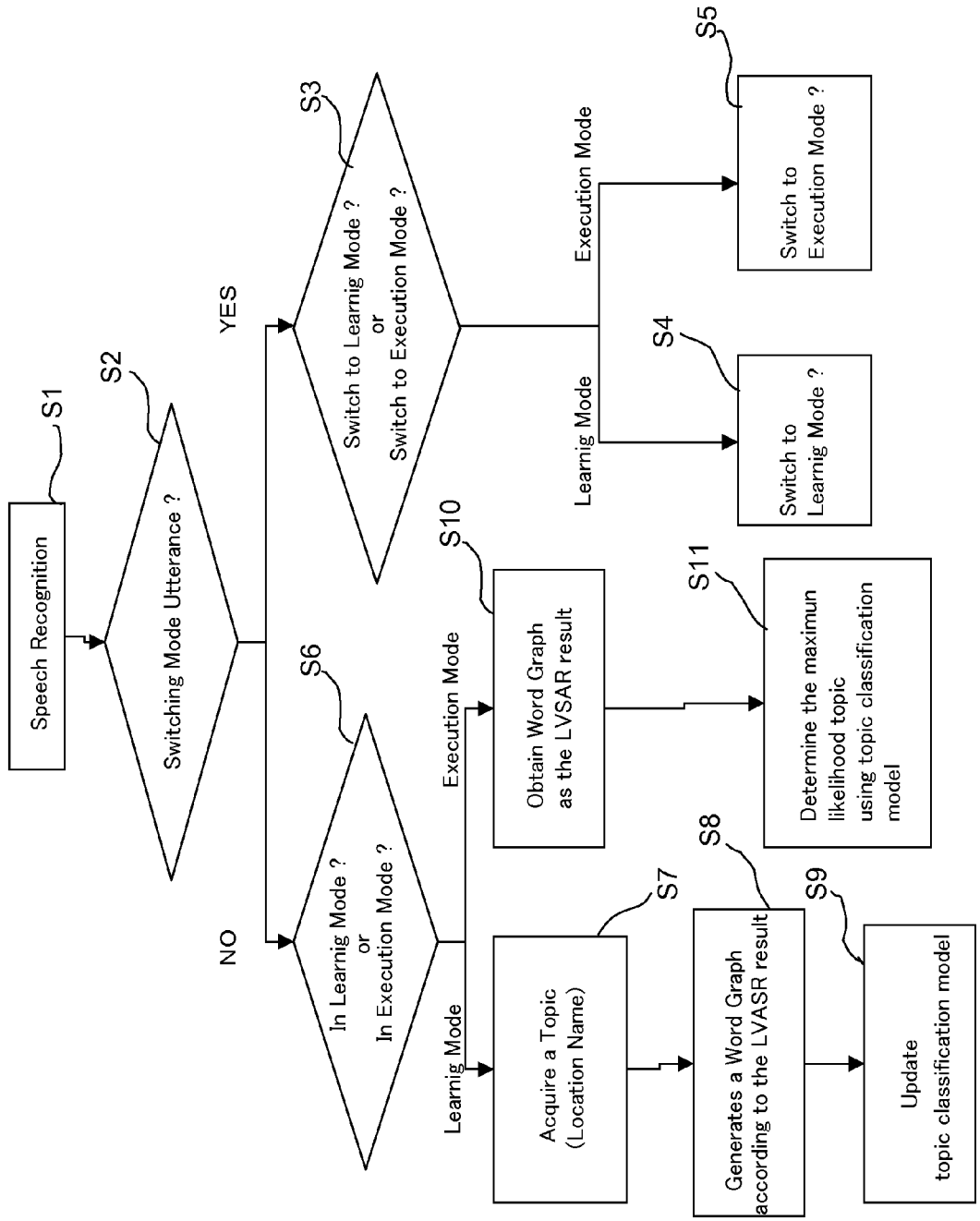
FIG. 6 is a flow chart for the dialogue-based learning apparatus of FIG. 4.

As shown in FIG. 6, the speech recognition unit 20 recognizes speeches based on speech signals from the speech input unit 10 (step S1). Then, the behavior and dialogue controller 30 determines if the speech recognition result includes a switching mode utterance (step S2). For example, if a text extracted from the speech recognition result includes "learning mode", the behavior and dialogue controller 30 determines that it is a switching mode utterance to the learning mode.

If a switching mode utterance is included, the behavior and dialogue controller 30 determines the mode to be switched, switch to the learning mode or to the execution mode (step S3), and performs mode switching instructed by the user (step S4 and S5).

On the contrary, when the result excludes a switching mode utterance at the step S2, the behavior and dialogue controller 30 determines current status of the robot which is in the learning mode or in the execution mode (step S6). If the robot is in the learning mode, the behavior and dialogue controller 30 acquires a user utterance, or location information (step S7), generates a word graph according to the acquired speech (step S8), and update a set of word graphs stored in the apparatus, or information consisting of topics (step S9). On the other hand, if the robot is in the execution mode, the behavior and dialogue controller 30 generates a word graph according to the user utterance (step S10), and determines the maximum likelihood topic (location name) from the word graph generated in the step S10 and topic categories memorised at step S9 (step S11). Thus, the robot grasps the topic in the user utterance.

Following the script shown in FIG. 7, operations of the mode switching expert 35 and the topic recognition expert 34 are now described.

a) Learning Mode

To begin learning, a user utters a mode switching command (U0). This utterance is recognized by the SVASR 21 and is sent to all experts from the understanding module 31. If the recognition result is good enough, the mode switching expert 35 returns the highest score back among all the experts. Then, that makes the mode expert 35 activate.

The charged mode switching expert 35 switches into the learning mode according to the command, generates a response informing the user about the current state of the robot (R1), and directs the planning module to make the topic recognition expert 34 in charge next. Hereafter, as long as in charge, the topic recognition expert 34 returns a middle-level score (0.5) when the understanding module dispatches speech recognition results while the topic recognition expert 34 always returns a score of 0 if not in charge. Thus, until it is deprived of being in charge by any other expert with a higher score, the topic recognition expert 34 responds to all user input. While the topic recognition expert 34 is in charge and in the learning mode, it keeps the robot moving near the user.

When the topic recognition expert 34 responds to a user input (U2), it uses the recognition results of the LVASR 22. The recognition results of the SVASR 21 are just ignored. The topic recognition expert 34 received user input memorises the pair of the frequency pattern of a word acquired from the word graph and the current position of the robot, and generates a response informing the user that the robot has learned a named location (R3). If the user wants, he/she can give additional input at the same position to the robot. The memorized frequency pattern is updated with frequency pattern of words in the additional input.

Sometimes, the robot misrecognizes a command in a user utterance as a location name. In such a case, the user can cancel the immediately preceding unintended learning by saying "Cancel."

b) Execution Mode

When learning has been completed, the user utters a mode switching command (U6). According to this command, the mode switching expert 35 generates a response informing the user that the topic recognition expert 34 takes charge and switch into the execution mode (R7). In response each user input (U8), the topic recognition expert 34 retrieves a frequency pattern of words from the recognition results and chooses the most appropriate topic in its memory. Then the topic recognition expert 35 navigates the robot to the retrieved coordinate point with an acknowledgement (R9).

A user can specify a sequence of locations and direct a route to a robot. For that purpose, the user utters a command to start a route specifications such as "Start routing." After an acknowledgement for the command from the robot, the user utters location names one-by-one. If the user utters another command to complete the route specifications such as "End routing", the robot starts moving to the specified locations sequentially. These commands are handled by the mode switching expert 35.

[4] An Embodiments of the Dialogue-based Learning Apparatus

Figure 8:
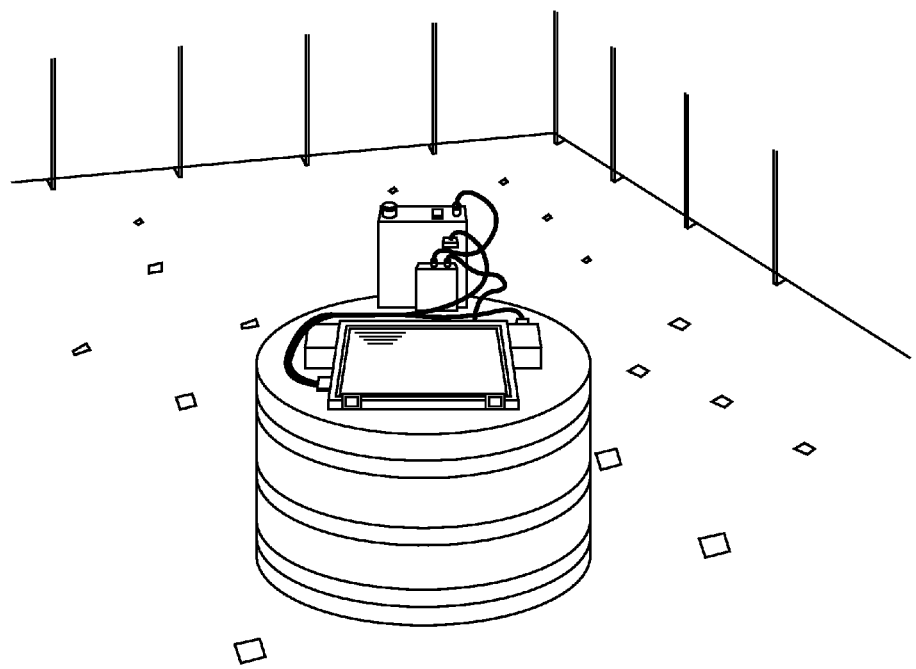
FIG. 8 shows a robot in accordance with an embodiment of the present invention.

A preliminary experiment was conducted using a cart robot (omnidirectional cart robot) shown in FIG. 8. Julius (high performance speech recognition software) and Julian were used for the LVASR 22 and SVASR respectively. Julian is a variant of Julius, which uses network grammar instead of an n-gram language model.

For localization of the user and robot, ultrasonic sound beacons were used. Both the user and robot were equipped with ultrasonic beacons, and were inside a room equipped with ultrasonic sensors. Thus, the robot recognizes user's position on the absolute coordinate system of the room.

Detected coordinates by ultrasonic sound beacons sway due to noises even if beacons are static. In addition, the robot itself slightly drifts while waiting for a user utterance. Therefore, the robot considers two coordinates as the same if the distance between the two coordinates is shorter than a threshold. This is necessary to instruct the robot with multiple utterances for a location. The threshold is given a priori for the moment.

[5] Evaluation of the Embodiments of the Dialogue-based Learning Apparatus (5-1) Method The experiment was conducted in the room whose size is 7 meters by 4 meters. Five positions in the room were selected and marked with numbered cards #1 to #5.

Subjects participated in the experiment moved from position #1 to #5 in a sequential order and uttered the name of each position with a close-talking microphone. The names of the positions could be named by each subject.

(5-2) Results

Four subjects participated in the experiment. In the learning mode, two of them (subjects #1 and #3) instructed the robot with just one utterance per location. The other two instructed the robot with three utterances per location.

Table 1 shows the results of the trails.

TABLE 1

| | RECOGNITION RATE | | | | |
|---|---|---|---|---|---|
| Subject # | 1 | 2 | 3 | 4 | Ave. |
| Accuracy (%) | 73.3 | 86.7 | 86.7 | 86.7 | 83.3 |

The dictionary and the language model of Julius were distributed with the software, which were built from the web text. The size of the dictionary was 60248 words. The number of unknown words in the instructed names was 2 out of 26 words used in this experiment (7.7%). There was no difference between names including unknown words and names not including unknown words in terms of topic recognition accuracy.

The dialogue-based learning apparatus in accordance with the embodiment generates and memorises a word graph according to a user utterance correspondent to its phoneme if the utterance includes unknown words. In the case a user utterance includes same unknown words thereafter, the apparatus determines a corresponding topic from among the word graphs, or topics. Specifically, the apparatus retrieves a corresponding topic from among the candidates memorised in the apparatus in accordance with the formula (1) and (2) described above. Then, the best matching word is determined by the mutual information (formula 3) from among words in the matched-topic.

A word newly input to the robot, or undefined word in the dictionary, is extracted and recognized as the most appropriate topic to the speech recognition result (frequency pattern). By using frequency patterns, it is robust against misrecognitions. In addition it is free from the out-of-vocabulary problem.

The invention has been described in detail with reference to particular embodiment, but it will be understood that variations can be effective within the spirit of the invention.

The foregoing description illustrates the embodiment that the dialogue-based learning apparatus in accordance with present invention is applied to a robot. However, it does not limit to a domestic robot and may be used for industrial one, for example, it may be applicable to an unmanned cart coordinated with a running system.

In the foregoing embodiment, a robot is designed to move around by following its user and to learn spoken location names as pairs of name information and coordinate information in the learning mode. However, the robot may learn pointed location names as pairs of name information and coordinate information by recognizing a direction that a user indicates at a distance.

The dialogue-based learning apparatus in accordance with present invention may be incorporated in a car navigation system. In this case, a passenger or a driver utters current position, for example "F", while the car drives or stops. The dialogue-based learning apparatus memorises a word graph for "F" and GPS information about "F". Thereafter, if the driver activates the execution mode of the dialogue-based learning apparatus in the car navigation system and utters "F" when the car drives to some other place, for example "H" (H is a location name), the car navigation system retrieves the GPS information for "F" and arranges the route from "H" to "F".

The dialogue-based learning apparatus in accordance with present invention may be architect to switch a topic in learning mode automatically by means that the apparatus itself moves to other place.

The foregoing description illustrates the embodiment of the dialogue-based learning apparatus for learning location and location names, however, the dialogue-based learning apparatus in accordance with present invention is used for learning any object. In such cases, every target object to be memorized by the apparatus has an ultrasonic beacon, and the dialogue-based learning apparatus generates an associated word graph according to a name in a user utterance and memorises the object as pair of its word graph and its frequency obtained from the ultrasonic beacon. Such architecture enables learning for an object.

In the above embodiment, the dialogue-based learning apparatus 1 issues an utterance to a user via a dialogue unit 40 which synthesizes speeches. However, it can be designed as a non-dialogue-based learning apparatus equipped with a display as an indicator or a lamp as a notifier instead of the dialogue unit.

Industrial Applicability

The present invention enables a conversational domestic robot to learn location names through speech interaction, for example. Each acquired name is associated with a point on the map coordinate system of the robot. Both for acquisition and recognition of location names, a bag-of-words-based categorization technique is used. Namely, the robot acquires a location name as a frequency pattern of words, and recognizes a spoken location name by computing similarity between the patterns. This makes the robot robust not only against speech recognition errors but also against out-of-vocabulary names. A dialogue and behavior management subsystem in accordance with the present invention is designed to learn location names and to navigate to indicated locations, and implemented in an omnidirectional cart robot. The result of a preliminary evaluation of the implemented robot suggested this approach is promising.

What is claimed is:

1. A non-dialogue-based learning apparatus, comprising:
a speech input unit for inputting speeches;
a speech recognition unit for recognizing the input speech; and
a behavior and dialogue controller for controlling behaviors and dialogues according to speech recognition results,
wherein the behavior and dialogue controller has a topic recognition expert to memorise contents of utterances and to retrieve the topic that best matches the speech recognition results, and a mode switching expert to control mode switching,
wherein the mode switching expert switches operation modes of the apparatus between a learning mode and an execution mode in accordance with a command in the recognized speech input through a user utterance,
wherein in the learning mode, the topic recognition expert creates a word graph from each speech that the user utters as corresponding to a new topic, the word graph being a plurality of candidate words or sentences that are constructed by words contained in a predetermined dictionary together with associated matching probabilities with respect to the uttered speech, and the topic recognition expert registers each of words constituting the word graph together with associated occurrence frequencies as representing said new topic, the topic recognition expert registering, as representing said new topic, words and associated occurrence frequencies generated by a plurality of the word graphs when the user utters plural speeches as corresponding to the new topic, and
wherein in the execution mode, the topic recognition expert performs searches from among topics that have been registered in the learning mode, and selects the maximum likelihood topic.

2. The non-dialogue-based learning apparatus of claim 1, wherein in the learning mode, when the user's speech includes a plurality of words undefined in the predetermined dictionary, each undefined word is substituted with words defined in the dictionary or a combination of words defined in the dictionary having a similar phoneme sequence when the topic recognition expert creates the word graph therefor.

3. The non-dialogue-based learning apparatus according to claim 1, wherein the speech recognition unit comprises a Small Vocabulary Automatic Speech Recognizer SVASR and a Large Vocabulary Automatic Speech Recognizer LVASR,
wherein in the behavior and dialogue controller, a recognition result of the SVASR is forwarded to the mode switching expert, and when the mode switching expert makes a determination on mode switching, the topic recognition expert operates in the learning or execution mode that has been determined by the mode switching expert, and
wherein in the learning mode, the topic recognition expert generates a word graph based on speech recognition using the LVASR.

4. A dialogue-based learning apparatus through dialogue with users, comprising:
a speech input unit for inputting speeches;
a speech recognition unit for recognizing the input speech; and
a behavior and dialogue controller for controlling behaviors and dialogues according to speech recognition results,
wherein the behavior and dialogue controller has a topic recognition expert to memorise contents of utterances and to retrieve the topic that best matches the speech recognition results, and a mode switching expert to control mode switching,
wherein the mode switching expert switches operation modes of the apparatus between a learning mode and an execution mode in accordance with a command in the recognized speech input through a user utterance,
wherein in the learning mode, the topic recognition expert creates a word graph from each speech that the user utters as corresponding to a new topic, the word graph being a plurality of candidate words or sentences that are constructed by words contained in a predetermined dictionary together with associated matching probabilities with respect to the uttered speech, and the topic recognition expert registers each of words constituting the word graph together with associated occurrence frequencies as representing said new topic, the topic recognition expert registering, as representing said new topic, words and associated occurrence frequencies generated by a plurality of the word graphs when the user utters plural speeches as corresponding to the new topic, and
wherein in the execution mode, the topic recognition expert performs searches from among topics that have been registered in the learning mode, and selects the maximum likelihood topic.

5. The dialogue-based learning apparatus of claim 4, wherein in the learning mode, when the user's speech includes a plurality of words undefined in the predetermined dictionary, each undefined word is substituted with words defined in the dictionary or a combination of words defined in the dictionary having a similar phoneme sequence when the topic recognition expert creates the word graph therefor.

6. The dialogue-based learning apparatus according to claim 4, wherein the speech recognition unit comprises a Small Vocabulary Automatic Speech Recognizer SVASR and a Large Vocabulary Automatic Speech Recognizer LVASR,
wherein in the behavior and dialogue controller, a recognition result of the SVASR is forwarded to the mode switching expert, and when the mode switching expert makes a determination on mode switching, the topic recognition expert operates in the learning or execution mode that has been determined by the mode switching expert, and
wherein in the learning mode, the topic recognition expert generates a word graph based on speech recognition using the LVASR.

7. A dialogue-based learning apparatus through dialogue with an utterer, comprising:
a speech input unit for inputting speeches from the utterer;
a speech recognition unit for recognizing the input speech; and
a behavior and dialogue controller for controlling behaviors and dialogues according to speech recognition results,
wherein the behavior and dialogue controller includes a topic recognition expert and a mode switching expert, the topic recognition expert memorizing contents of utterances and retrieving a topic that best matches speech recognition results, the mode switching expert controlling mode switching,
wherein the mode switching expert switches modes in accordance with a user utterance,
and wherein in a first mode, the topic recognition expert registers, as corresponding to a new topic, a plurality of words and frequencies of each of the plurality of words contained in an utterance that is uttered by the utterer as corresponding to the new topic, and in a second mode, the topic recognition expert selects index terms that are to be used in determining to which topic, among the registered topics, an utterance by the utterer belongs in accordance with relevancy of the index terms to respective topics, and determines, among the registered topics, a topic that generates a maximum likelihood based on said index terms as the topic indicated by the utterance by the utterer;

wherein in the first mode, the topic recognition expert generates a word graph from the utterance uttered by the utterer and registers the word graph as corresponding to the new topic;

wherein a phoneme of an unknown word is substituted with the word graph of a known word and/or combination of known words having a similar phoneme sequence in a dictionary if a user utterance includes a plurality of words undefined in the dictionary.

8. The dialogue-based learning apparatus according to claim 7, wherein the mode switching expert switches modes between a learning mode, which is the first mode, and an execution mode, which is the second mode, in accordance with speech recognition results by the speech recognition unit of the utterance uttered by the utterer.

9. The dialogue-based learning apparatus according to claim 7, wherein the speech recognition unit comprises a Small Vocabulary Automatic Speech Recognizer SVASR and a Large Vocabulary Automatic Speech Recognizer LVASR, wherein in the behavior and dialogue controller, a recognition result of the SVASR is forwarded to the mode switching expert, and when the mode switching expert makes a determination on mode switching, the topic recognition expert operates in the first or second mode that has been determined by the mode switching expert, and wherein in the first mode, the topic recognition expert generates a word graph based on speech recognition using the LVASR.

* * * * *